(12) United States Patent
Zhu et al.

(10) Patent No.: US 6,369,190 B1
(45) Date of Patent: Apr. 9, 2002

(54) EXTRACTION OF TRIETHYLAMINE IN POLYCARBONATE BY THE USE OF STATIC MIXERS

(75) Inventors: Mingjie Zhu; Allen Wai-Yee Ko, both of Evansville, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/712,321

(22) Filed: Nov. 14, 2000

(51) Int. Cl.[7] ................................................ C08G 64/00
(52) U.S. Cl. ...................................... 528/196; 528/198
(58) Field of Search ................................ 528/196, 198, 528/480

(56) References Cited

U.S. PATENT DOCUMENTS 5,260,418 A  11/1993  Wulff et al. ................. 528/502

*Primary Examiner*—Terressa M. Boykin

(57) ABSTRACT

This invention relates to a method for purifying a polycarbonate resin solution resulting from an interfacial polymerization process. More particularly, this invention provides for the use of at least one static mixer to facilitate separation of the catalyst used to prepare the polycarbonate from the polycarbonate resin solution.

9 Claims, 2 Drawing Sheets

EXTRACTION OF TRIETHYLAMINE IN POLYCARBONATE BY THE USE OF STATIC MIXERS

This invention relates to a method for purifying a polycarbonate resin solution resulting from an interfacial polymerization process. More particularly, this invention provides for the use of at least one static mixer to facilitate separation of the catalyst used to prepare the polycarbonate from the polycarbonate resin solution.

BACKGROUND OF THE INVENTION

There are many well known processes for the preparation of polycarbonates from monomers. A preferred method is a two-phase interfacial process in which phosgene is contacted with aromatic bisphenols and condensed to produce high molecular weight polycarbonates.

The two-phase interfacial process results in a reaction mixture which is an emulsion of organic and aqueous alkaline phases. In order to recover the polycarbonate product from the organic phase in which it is found, the reaction mixture must first be separated into its organic and aqueous alkaline phases, and the organic phase must be further processed to remove undesirable impurities including electrolytes, catalysts, residues of chain terminators, and unreacted starting materials.

Typically, such reaction mixtures contain polycarbonate polymers with molecular weights up to 250,000 g/mol on a polycarbonate basis and brine in an amount typically around one quarter by weight of the reaction mixture. Further, the reaction mixtures may exhibit a wide range of viscosities. In conventional processes, the initial separation of the aqueous alkaline phase from the organic phase is not complete, but leaves the organic phase containing some ten percent or more of an aqueous component as well as residual impurities such as catalysts, residues of chain terminators, and unreacted bisphenols. Thus, additional steps are required to purify the organic phase.

SUMMARY OF THE INVENTION

Accordingly, it is a goal of the invention to provide a process for purifying polycarbonate resin solutions which facilitates removal of starting materials such as a catalyst from the polycarbonate resin solution.

This and other goals of the invention are obtained by separating the polycarbonate resin solution resulting from the interfacial process into a brine phase and an organic phase. The organic phase, which contains not only the desired polycarbonate resin but also unwanted residual starting material, i.e. catalyst and water, is conveyed into at least one static mixer. In a more preferred embodiment, the organic phase is combined with a wash acid water stream prior to entering the at least one static mixer. The output of the static mixer is separated into an organic phase and an aqueous phase. The aqueous phase includes a greater concentration of catalyst than the organic phase which contains the desired polycarbonate resin. In this manner the inventive process provides for extraction or removal of starting material or catalyst from the desired polycarbonate resin product.

BRIEF DESCRIPTION OF THE DRAWINGS

For a better understanding of the present invention and its objects, reference is made to the detailed description below to be considered in light of the complete application, the scope of this invention as pointed out in the appended claims, and in combination with the drawings of which:

DETAILED DESCRIPTION OF THE PREFERRED EMBODIMENTS

Figure 1:
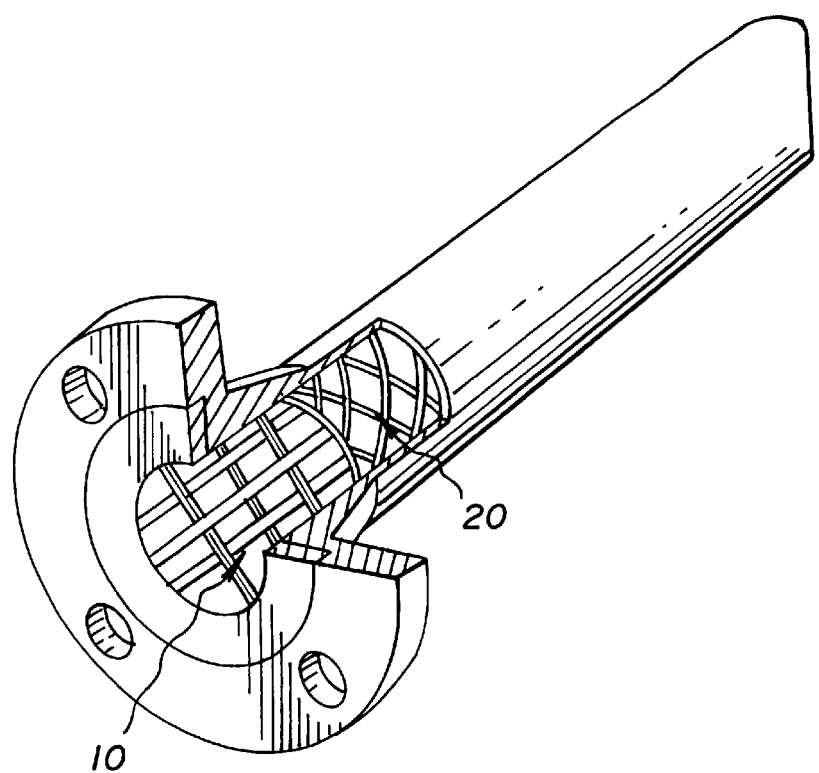
FIG. 1 is a partial cut away view of a static mixer for use in the invention.

The present invention provides for separation of a starting material such as catalyst from a polycarbonate resin containing solution resulting from an interfacial polymerization process.

The reaction mixture to be separated with this invention is the effluent from a resin reactor producing polycarbonate. Polycarbonate can be produced in batch or continuous mode by a two-phase interfacial process. The resin reactor effluent comprises a heavy organic component including the desired polycarbonate and a light aqueous inorganic component. Typically, the ratio of the aqueous phase to the organic phase is 10:90 to 70:30 weight percent. The polycarbonate component is typically present in an amount of 10 to 20 weight percent. The polycarbonate contained in the effluent may have, but is not limited to, molecular weight from about 15,000 to about 40,000 g/mol on a polycarbonate basis. Consequently, the effluent may have a wide range of viscosities. The effluent may also have, but is not limited to, a salt concentration of 14–22 weight percent.

This reaction mixture or emulsion is initially separated into a heavy organic phase which includes the desired polycarbonate resin and a light aqueous or brine phase which is discarded. Suitable devices for carrying out such separation include but are not limited to plate decanters, coalescing decanters and centrifuges.

Especially preferred is a plate decanter consisting of a container having a long axis which is oriented at an angle with respect to gravity, the angle typically being from 30° to 60°, preferably about 45°. The decanter is filled with plates, which also are therefore at the same angle. Preferably, the plates have a corrugated structure. The reaction mixture to be separated is introduced into the top of the plate decanter, and under the influence of gravity the heavier phase flows to the bottom of the decanter while the lighter phase flows to the top. The principles governing gravity decantation of an emulsion are based on Stoke's Law. For example, in a decanter, as the difference in density between the dispersed and continuous phases of an emulsion increases, the separation time decreases.

The use of a plate decanter can be combined with coalescence devices. Coalescence is the process by which droplets of the dispersed phase of an emulsion are brought together to form a continuous phase. It is known to those of skill in the art that coalescence of polycarbonate dispersions can be achieved by conducting the dispersion through a layer of fibers, preferably glass, steel, or polymeric fibers.

More particularly, coalescing elements are added to the interior of an empty decanter. Preferably, the coalescing elements are a combination of metal and teflon such as elements available from Otto York. The coalescing size and number so as to provide a residence time in the decanter of 3 to 15 minutes, preferably, 1.5 to 2 minutes. The optimum residence time may be scale dependant and can be experimentally determined.

Alternately, one or more plate decanters is combined with other separation devices including decanter coalescers and centrifuges. Various combinations of these devices can be used to separate polycarbonate reactor effluent.

Detection of the location interface of the two separated phases in a decanter can be improved by utilizing a sonar or ultrasonic probe. A sonic wave is sent from the clear aqueous phase toward the interface with the polycarbonate resin containing phase. The echo from the interface is used to determine the interface location. By determining the location of the interface more precisely, cross contamination of separated phases upon transfer is minimized.

The separated heavy organic phase is fed into a static mixer with a water and acid solution ("wash acid water") for further purification for catalyst removal. Typically, the catalyst is a basic material such as triethylamine. Preferably, the concentration of acid in the water is in the range of 0.01 to 1 mole per liter and the volume ratio of wash acid water to the organic phase is in the range of 0.05 to 5. The wash acid water may be fed separately, or may be in whole or part comprised of a recycle stream which represents the aqueous phase separated downstream using a centrifuge such as the example configuration shown in FIG. 3.

Figure 2:
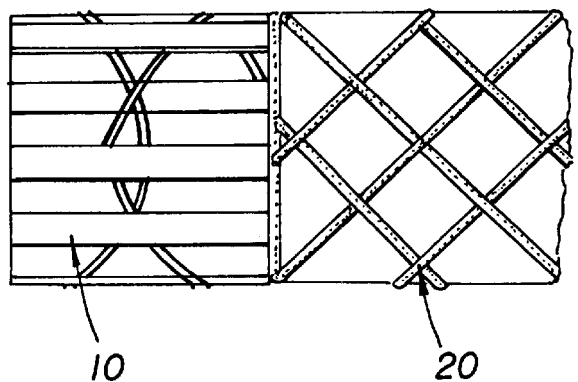
FIG. 2 is an exploded side view of portions of the static mixer illustrated in FIG. 1.

Suitable static mixers include Koch SMX type static mixers available from Koch-Glitsch, Teaneck, N.J. Other suitable SMX static mixers are available from Sulzer Chemtech AG in Winterthur, Switzerland. A cut away view of a suitable static mixer is shown in FIG. 1. An exploded view of mixing elements 10 and 20 is shown in FIG. 2. One static mixer could be used, or several static mixers may be used in series. Each mixer typically has four to eight mixing elements.

EXAMPLE 1

A separated heavy organic phase having a polycarbonate resin concentration of 18.5 weight percent and TEA concentration of 503 ppm was conveyed into three Koch SMX type static mixers arranged in series having a half inch inner diameter and six static mixing elements at a flow rate of 2000 gm/min. A 0.1M HCl solution was conveyed into the first static mixer at a flow rate of 480 ml/min. An aliquot of the mixture was removed from each of the three static mixers and allowed to settle under gravity into two phases, an organic phase and an aqueous phase. An aliquot was removed from each static mixer and each aliquot allowed to phase separate under the influence of gravity. The TEA content in each of the separated organic phases was determined calorimetrically using methyl orange indicator, and is reported in Table 1:

TABLE 1

| Aliquot Sample Source | TEA Concentration (PPM) |
| --- | --- |
| First Static Mixer | 1.37 |
| Second Static Mixer | 0.96 |
| Third Static Mixer | 0.81 |

As can be seen from Table 1 the static mixer is an effective mixing device for extraction of TEA from polycarbonate resin solutions. In addition, while a single static mixer is sufficient for this purpose, marginal improvement can be achieved by using additional static mixers in series.

EXAMPLE 2

A separated heavy organic phase was conveyed into a three static 15 mixers arranged in series as described in Example 1 at a flow rate of 1075 gm/min. A 0.1M HCl solution was conveyed into the first static mixer at a flow rate of 240 ML/min. Aliquots from each of the three static mixers were removed and allowed to settle into an organic phase and an aqueous phase. The TEA content of each of the organic phases was determined in accordance with Example 1 and is reported in Table 2.

TABLE 2

| Aliquot Sample Source | TEA Concentration (PPM) |
| --- | --- |
| First Static Mixer | 1.30 |
| Second Static Mixer | 0.44 |
| Third Static Mixer | 0.26 |

EXAMPLE 3

A separated heavy organic phase was conveyed into a series of static mixers as described in Example 1 at a flow rate of 1950 gm/min. A 0.1M HCl solution was conveyed into the first static mixer at a flow rate of 240 ml/min. Aliquots from each of the three static mixers were removed and allowed to settle into an organic phase and an aqueous phase. The TEA content of each of the organic phases was determined in accordance with Example 1 and is reported in Table 3.

TABLE 3

| Aliquot Sample Source | TEA Concentration (PPM) |
| --- | --- |
| First Static Mixer | 1.81 |
| Second Static Mixer | 1.02 |
| Third Static Mixer | 0.78 |

Example 4

Figure 3:
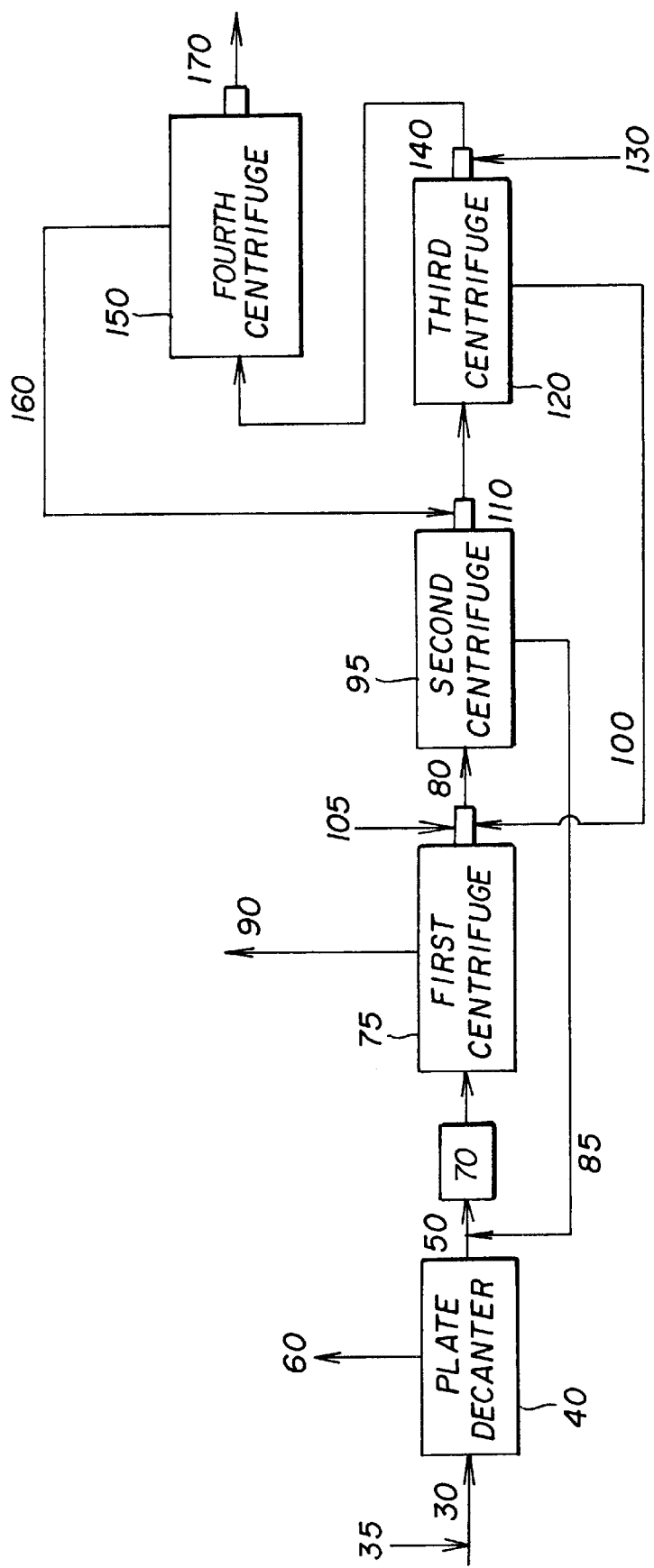
FIG. 3 is a schematic illustrating a separation network which includes a plate decanters in series with one static mixer and four centrifuges in accordance with the invention.

A polycarbonate resin containing emulsion reaction mixture resulting from an interfacial polymerization process can be separated into a heavy organic phase and a light phase as shown in FIG. 3. A reaction mixture 30 may be mixed with water 35 and introduced into a plate decanter 40 which can separate the emulsified reaction mixture into a first heavy organic phase 50 and a lighter first aqueous brine phase 60. Preferably, the residence time in the plate decanter is 5 to 25 minutes. The lighter aqueous brine phase 60 will be removed from plate decanter 40 and discarded. The heavier organic phase 50 will be introduced into one static mixer 70 having 4 mixing elements along with a recycled aqueous HCl wash phase 85 from second centrifuge 95. The output of the static mixer 70 will be separated in a first centrifuge 75 into a second organic phase 80 and a second aqueous phase 90 containing TEA and HCl which will be removed. The second organic phase 80 from centrifuge 75 will be mixed with HCl 105 and wastewater wash stream 100 from third centrifuge 120 and added to second centrifuge 95 in series. The organic phase from the second centrifuge 110 will be mixed with wastewater wash stream 160 from the fourth centrifuge 150 and separated in the third centrifuge 120. The organic phase 140 from the third centrifuge 120 will be mixed with water 130 and separated in the fourth centrifuge 150 resulting in organic phase 170 including the desired polycarbonate resin.

While there have been described illustrative embodiments of this invention, those skilled in the art will recognize that they may be changed or modified without departing from the spirit and scope of this invention, and it is intended to claim all such changes and modifications that fall within the true scope of the invention as set forth in the appended claims. All documents referenced herein are specifically incorporated by reference in their entirety.

What is claimed is:

1. Method for separating catalyst from a polycarbonate solution prepared in an interfacial process comprising:

provividing a polycarbonate solution comprising a catalyst wherein the polycarbonate solution is prepared in an interfacial process, separating the polycarbonate solution into a first organic phase and a first aqueous phase, the first organic phase comprising polycarbonate and catalyst, conveying the first organic phase into at least one static mixer, and separating the first organic phase into a second organic phase and a second aqueous phase wherein the second aqueous phase includes a greater concentration of catalyst that the second organic phase, and removing the second aqueous phase from the second organic phase.

2. Method according to claim 1 further comprising introducing a wash acid water stream into a first of the at least one static mixer.

3. Method according to claim 2, wherein the wash acid water stream is a wastewater wash stream separated from an aqueous phase by a downstream centrifuge.

4. Method according to any one of claim 1 or claim 2 or claim 3 comprising separating the first organic phase in at least one centrifuge.

5. Method according to any one of claim 1 or claim 2 or claim 3 comprising separating the polycarbonate solution in a plate decanter.

6. Method according to claim 3 comprising separating the polycarbonate solution in a plate decanter.

7. Method according to any one of claim 1 or claim 2 or claim 3 comprising conveying the first organic phase into a first of three static mixers arranged in series.

8. Method according to claim 3 comprising conveying the first organic phase into a first of three static mixers arranged in series.

9. Method according to claim 5, wherein the location of the phase boundary between the first organic phase and the first aqueous phase in the decanter is determined using an ultrasonic device.

* * * * *